United States Patent

Funamoto et al.

Patent Number: 5,162,161
Date of Patent: Nov. 10, 1992

[54] MAGNETIC RECORDING MEDIUM AND METHOD FOR FABRICATING THE SAME

[75] Inventors: Susumu Funamoto; Yasushi Kitazaki, both of Odawara, Japan

[73] Assignee: Hitachi, Ltd., Tokyo, Japan

[21] Appl. No.: 295,766

[22] Filed: Jan. 11, 1989

[30] Foreign Application Priority Data

Jan. 13, 1988 [JP] Japan .................. 63-3864

[51] Int. Cl.⁵ .......................... G11B 5/66; G11B 23/00
[52] U.S. Cl. ...................... 428/694; 428/611; 428/666; 428/667; 428/900; 428/695
[58] Field of Search .............. 428/694, 900, 611, 666, 428/667, 695

[56] References Cited

U.S. PATENT DOCUMENTS

| | | | |
|---|---|---|---|
| 4,414,271 | 11/1983 | Kitamoto et al. | 428/695 |
| 4,476,195 | 10/1984 | Ono et al. | 428/695 |
| 4,503,119 | 3/1985 | Shirahata et al. | 428/341 |

FOREIGN PATENT DOCUMENTS

| | | |
|---|---|---|
| 55-117741 | 1/1980 | Japan . |
| 55-163632 | 12/1980 | Japan . |
| 57-30124 | 2/1982 | Japan . |
| 59-84348 | 5/1984 | Japan . |
| 60-5423 | 1/1985 | Japan . |
| 61-94235 | 5/1986 | Japan . |

*Primary Examiner*—Paul J. Thibodeau
*Assistant Examiner*—R. Follett
*Attorney, Agent, or Firm*—Kenyon & Kenyon

[57] ABSTRACT

In a magnetic recording medium having a ferromagnetic metallic thin film formed on a substrate as a recording film, the recording film is formed from low density crystalline particles and impregnated with lubricant among the crystalline particles to improve the corrosion-resistivity and the slide-resistivity for a magnetic head.

2 Claims, 2 Drawing Sheets ered on the recording film to maintain the characteristic of the recording film and to improve the corrosion-resistivity thereof and the slide-resistivity thereof in view of the sliding movement of a magnetic head, as disclosed in JP-A-57-30124. Namely, the magnetic recording medium according to this prior art does not consider improving the corrosion-resistivity and slide-resistivity of the recording film itself which is made of a ferromagnetic metallic thin film. Therefore, if the protection film or the lubrication film which is provided on the recording film to improve the corrosion-resistivity or slide-resistivity thereof, contains some pinhole or local disappearance, the recording medium may begin to degrade in the region corresponding to that site, thus deteriorating the reliability of the magnetic recording medium.

MAGNETIC RECORDING MEDIUM AND METHOD FOR FABRICATING THE SAME

BACKGROUND OF THE INVENTION

The present invention relates to a magnetic recording medium such as a magnetic disk and more particularly to a magnetic recording medium having a metallic thin film with excellent corrosion-resistivity and slide-resistivity.

In order to realize high density recording on a magnetic recording medium such as a magnetic disk, the characteristic of a recording film has been improved and the film has been made thin. Also, a spacing between the recording medium and a recording/reproducing head has been reduced.

The recording medium having a ferromagnetic metallic thin film, formed through sputtering, as a recording film permits the recording film to be satisfactorily improved in its characteristic and made thin. However, such a magnetic recording medium requires a protection layer or lubrication layer or a composite of both protection and lubrication layers in order to maintain the characteristic of the recording film and to improve the corrosion-resistivity thereof and the slide-resistivity thereof in view of the sliding movement of a magnetic head, as disclosed in JP-A-57-30124. Namely, the magnetic recording medium according to this prior art does not consider improving the corrosion-resistivity and slide-resistivity of the recording film itself which is made of a ferromagnetic metallic thin film. Therefore, if the protection film or the lubrication film which is provided on the recording film to improve the corrosion-resistivity or slide-resistivity thereof, contains some pinhole or local disappearance, the recording medium may begin to degrade in the region corresponding to that site, thus deteriorating the reliability of the magnetic recording medium.

In order to obviate the above problem, it has been proposed to impregnate the recording film itself with lubricant to improve the corrosion-resistivity and slide-resistivity of the recording film itself. Also, in order to further improve the corrosion-resistivity and slide-resistivity of the recording film itself, it has been proposed to store the lubricant in many minute pores or grooves formed on the recording film surface using a grinding paper or the like, thereby increasing the amount of the lubricant impregnated in the recording film, as disclosed in JP-A-55-117741 and JP-A-55-113632. Further, it has been also proposed to impregnate the protection film formed on the recording film or an additional layer underlying the recording film with the lubricant through many minute pores or grooves formed on the surface thereof, as disclosed in JP-A-61-94235, JP-A-60-5423 and JP-A-59-84328.

However, the above technique of providing many minute pores or grooves on the recording film surface for increasing the amount of lubricant impregnated in the recording film has a problem of deteriorating the recording characteristic since these pores or grooves do not pertain to the recording of information.

This technique, which requires an extra step, also makes the entire fabricating process of a magnetic recording medium complicated and expensive.

Further, the above technique of providing minute pores or grooves in the protection film or underlying layer, which requires an additional processing step, makes the fabricating process more complicate.

SUMMARY OF THE INVENTION

The present invention solves the problems of the known configuration provided by a magnetic recording medium which can provide improved corrosion-resistivity and slide-resistivity without deteriorating the recording characteristic and without requiring an extra fabricating step in a method for fabricating the medium.

The present invention can be attained by a magnetic recording medium having a ferromagnetic metallic thin film formed on a substrate as a recording film in which the recording film is made of low density crystalline particles of magnetic material and lubricant is impregnated among the crystalline particles.

The recording film is preferably a film of cobalt system ferromagnetic metal. The recording film made of low density particles can be formed through any one of a number of suitable techniques. One example of the suitable techniques is a sputtering technique. In using the sputtering technique, the atmospheric pressure (e.g. Ar pressure) is increased to reduce the density of crystalline particles in the recording film, thereby making the recording film porous.

A preferred crystalline particle density in the recording film is 100 cps/nm (the number of counts per 1 second for the film thickness of 1 nm) for a fluorescent X-ray relative density. The fluorescent X-ray relative density means the average number of counts per 1 second for the film thickness of 1 nm of an object to be measured in the case where the fluorescent X-rays, which are emitted from the object when the object is irradiated with X-rays having a spot diameter of 15 mm, are measured for 10 seconds in a fluorescent X-ray analysis device under the measurement condition of a turn-on (supply) voltage of 50 KV and a turn-on (supply) current of 60 mA in an X-ray tube.

In accordance with the present invention, the recording film of a desired low density of crystalline particles can be formed by suitably setting the sputtering condition, e.g. gas pressure, a turn-on electric power, etc. Further, the recording film of low-density crystalline particles permits a large amount of lubricant to be impregnated among the crystalline particles in the recording film so that the corrosion-resistivity and the slide-resistivity of the recording film can be improved. Thus, it is not necessary to form minute pores or grooves on the recording film surface in the present invention unlike in the prior art. This makes it unnecessary to use an extra fabricating step and prevents the recording characteristic from deteriorating.

The corrosion-resistivity and slide-resistivity can be further improved through a simple step by forming the protection film and underlying layer from low density crystalline particles and impregnating them with lubricant in the same manner as in the recording film.

DESCRIPTION OF THE PREFERRED EMBODIMENTS

With reference to the drawings, several embodiments of the magnetic recording medium and a method for fabricating it will be explained below.

Figure 1:
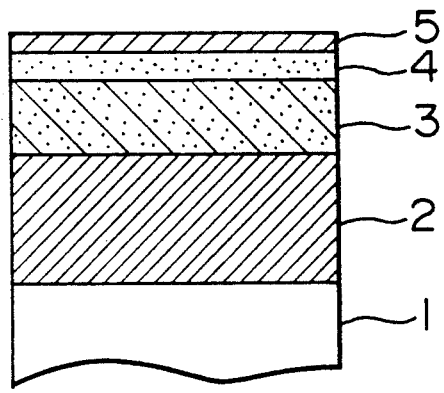
FIG. 1 is a sectional view of a magnetic recording medium according to one embodiment of the present invention.

FIG. 1 is a sectional view of the magnetic recording medium, e.g. magnetic disk, according to one embodiment of the present invention. In this Figure, 1 is a substrate made of e.g. aluminum; 2 is an underlying layer made of e.g. NiP; 3 is another underlying layer made of Cr which is formed through the sputtering technique, for example; 4 is a recording film of a Co-Ni alloy (Co 70% and Ni 30% by atoms) which is also formed through the sputtering technique, for example; and 5 is a protection film of carbon which is formed through the sputtering technique, for example.

The recording film 4 is preferably a cobalt system ferromagnetic metallic film (e.g. Co-Ni, Co-Pt, Co-Ni-Cr, etc) made of low density crystalline particles. The recording film of low density crystalline particles can be formed by performing the sputtering in an increased atmospheric pressure (Ar gas pressure).

Figure 2:
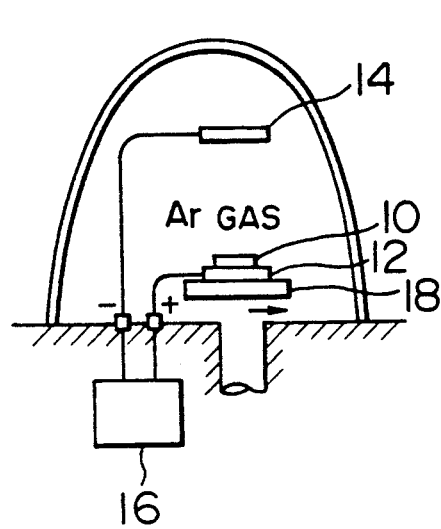
FIG. 2 is a schematic view of a sputtering device used for fabricating the magnetic recording medium according to the present invention.

FIG. 2 is a schematic view of a device for performing the sputtering. In FIG. 2, 10 is a substrate; 12 is an anode; 14 is a cathode; 16 is a D.C. power supply, and 18 is a stand on which the anode 12 and the substrate 10 are placed, and which can be shifted in a indicated by the arrow direction.

Figure 3:
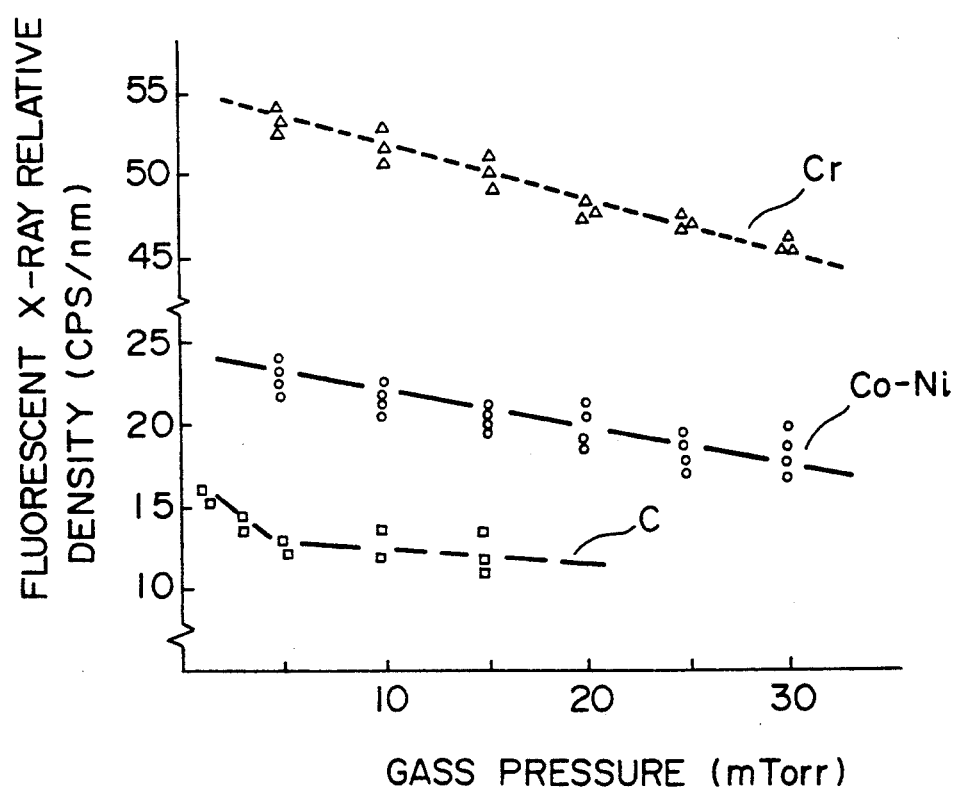
FIG. 3 is a graph showing the relation between an atmospheric gas pressure and film density in the sputtering.

The sputtering condition for an output power of the power supply 16 is 5 kw if the cathode 14 is made of Cr to form the underlying layer 3, 0.8 kw if the cathode 14 is made of Co-Ni to form the recording film 4, and 4 kw if it is made of C to form the protection film 5. A planar magnetron cathode is used as the cathode 14. The shifting speed of the substrate is set at 9 cm/min during the sputtering. The density of crystalline particles in the respective films (Cr film, Co-Ni film and C film) when the pressure of the inert gas used for the sputtering is varied is shown in FIG. 3. As shown in FIG. 3, the crystal particle density is reduced as the gas pressure is increased. The crystal particle density is represented by a fluorescent X-ray relative density (cps (count per second)/nm). Here, the fluorescent X-ray relative density means the average number of counts per 1 (one) second for the film thickness of 1 nm of an object to be measured in the case where the fluorescent X-rays, which are emitted from the object when the object is irradiated with X-rays having a spot diameter of 15 mm, are measured for 10 (ten) seconds in a fluorescent X-ray analysis device under the measurement condition of a turn-on voltage of 50 kv and a turn-on current of 60 mA in an X-ray tube. More specifically, the fluorescent X-ray relative density of the respective sputtering films (Cr film, Co-Ni film and C film) is obtained by dividing the average number of counts when the fluorescent X-rays (CrK$\alpha$, Co-NiK$\alpha$ and CK$\alpha$) emitted from the respective films irradiated with the X-rays under the above condition are measured three times for ten seconds by the thickness of the respective films.

Figure 4:
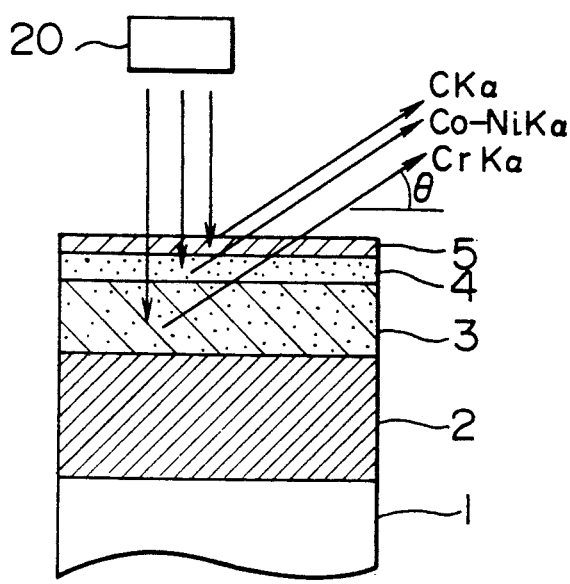
FIG. 4 is a view showing the principle of measuring the film density in a fluorescent X-ray analysis device.
Figure 5:
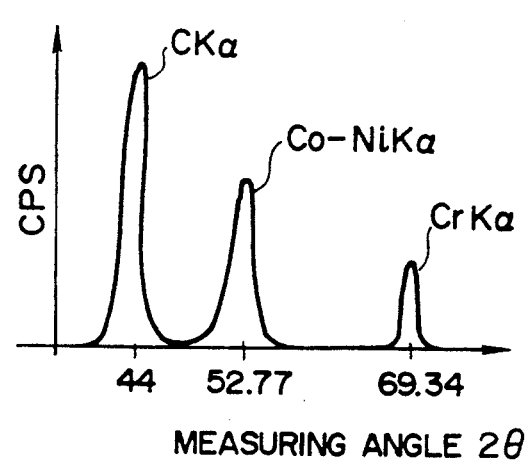
FIG. 5 is a graph showing fluorescent X-ray spectra used to measure the crystalline particle density of each film.

FIG. 4 is a view for explaining the principle of measuring the crystalline particle density in the fluorescent X-ray analysis device and FIG. 5 shows an example of the fluorescent X-ray spectra used to measure the crystalline particle density of each of the films. In FIG. 5, the abscissa axis shows a measuring angle 28 (see FIG. 4) of the respective axis fluorescent X rays and ordinate shows a count number per second of the X-rays.

When in FIG. 4, primary X-rays are incident to the respective sputtering films 3 (Cr), 4 (Co-Ni) and 5 (C) from the X-ray tube 20, the fluorescent X-rays CrK$\alpha$, Co-NiK$\alpha$ and CK$\alpha$ having spectra as shown in FIG. 5 are emitted from the respective films 3, 4 and 5. The film thickness of each film can be measured using e.g. a contact-needle type step meter (available by the trade name of Taly step meter).

The recording film having the fluorescent X-ray relative density measured in the above manner is applied and impregnated with lubricant such as perfluoropolyether system lubricant of 0.5 % concentration (available by the trade name of Phonblin). Then, if the relative density is 100 (cps/nm) or less, the recording film itself will be lubricated and hydrophobic, and so have desired corrosion-resistivity and slide-resistivity. The relative density ranging from 10 (cps/nm) to 100 (cps/nm) provides the most desired beneficial result.

Accordingly, the recording film of the magnetic recording medium according to the present invention can be impregnated with a large amount of lubricant since it is formed from low density crystalline particles. Particularly, the recording film having the relative density of the above range will be desirably hydrophobic and lubricative.

The lubricant may be one which was used for the conventional magnetic recording medium. Namely, a lubricant such as alkylpolyetherfluoride, perfluoropoly ether, fluorocarbon, etc. can be also used in the present invention.

Further, even if the protection film (if any) formed on the recording film has any pin-hole, the recording film will not corrode since it is hydrophobic. Moreover, if the magnetic recording medium according to the present invention is used as a CSS (contact start stop) type recording medium, the protection film may be partially destroyed or disappear due to contact of the recording medium with a magnetic head thereby exposing the recording film. However, in this case, information destruction due to corrosion or crush will not occur since the recording film itself is lubricative and hydrophobic.

The protection film is preferably made of non-magnetic material such as C, $SiO_2$, $SoN_4$, etc. Such a protection film, which has some minute pores formed when it is fabricated through the sputtering, does not obstruct to impregnating the recording film with the lubricant. However, the protection film is also preferably made of low density crystalline particles. Such a protection film can be formed through the sputtering which is performed controlling the atmospheric pressure in the same manner as in forming the recording film.

The relative density of the protection film is preferably 140 cps/nm or less and more preferably 10 to 140 cps/nm. If the protection film having such a low relative density is impregnated with the lubricant, a large amount of the lubricant is absorbed in the protection film, thereby further improving the corrosion-resistivity and the slide-resistivity of the magnetic recording medium.

Meanwhile, the magnetic recording medium having a ferromagnetic metallic thin film as the recording film generally has an underlying layer made of non-magnetic material (e.g. Cr). The magnetic recording medium according to this embodiment of the present invention may also use such an underlying layer. This underlying layer is preferably formed from low density crystalline particles and impregnated with the lubricant. The density thereof is preferably 100 cps/nm or less and more preferably 30 to 100 cps/nm. Such an underlying layer can be formed through the sputtering which is performed controlling the atmospheric pressure in the same manner as in forming the recording film. An other technique may also be used. The provision of the underlying layer 3 made of low density crystalline particles can further improve the corrosion-resistivity and recording characteristic of the magnetic recording medium.

In the magnetic recording medium according to this embodiment of the present invention, the film thickness of the recording film 4 is preferably about 200 to 1000 Å and more preferably about 400 to 800 Å; the thickness of the underlying layer 3 is preferably about 300 to 6000 Å and more preferably about 600 to 4000 Å; and the thickness of the protection film 5 is preferably about 200 to 800 Å.

Accordingly, the recording film, underlying layer and protection film, each having a desired relative density and thickness, can be formed by performing the sputtering for predetermined times under the predetermined sputtering conditions such as the Ar gas pressure as shown in FIG. 3. (The sputtering condition shown in FIG. 3 is only exemplary but other sputtering conditions may be used).

In a magnetic disk comprising the recording film, underlying layer and protection film each having the relative density in the above range, corrosion and head crush do not occur since the recording film itself is lubricative and hydrophobic, so that the magnetic disk exhibits high reliability. Particularly, since it is difficult to form the protection film having a large area free from any pinholes, this embodiment of the present invention can be efficiently adapted to a magnetic disk having such a large area.

Figure 6:
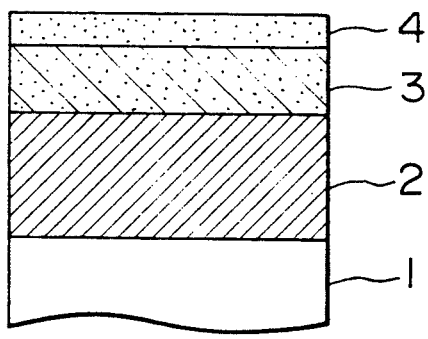
FIGS. 6, 7 and 8 are sectional views of a magnetic recording medium according to second, third and fourth embodiments of the present invention, respectively.
Figure 7:
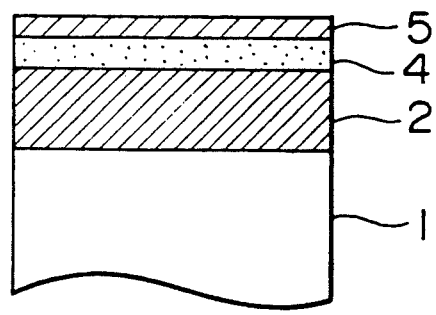
Figure 8:
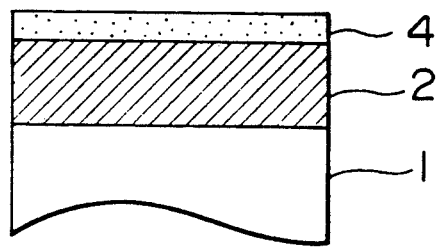

In accordance with other embodiments of the present invention, the protection film 5 may be removed from the embodiment of FIG. 1 as shown in FIG. 6; the underlying layer 3 may be removed therefrom as shown in FIG. 7 and both protection film 5 and underlying film 3 may be removed therefrom as shown in FIG. 8. In these embodiments, the material, relative density and thickness of each of these layers 3, 4 and 5 may be the same as in the embodiment of FIG. 1 to provide the same effect.

As explained above, in accordance with the present invention, the recording film is formed from low density crystalline particles and impregnated with lubricant so that the recording film itself can have improved corrosion-resistivity and without slide-resistivity without requiring any extra fabricating step and deteriorating the recording characteristic, thereby providing a magnetic recording medium with high reliability.

What is claimed is:

1. A magnetic recording medium comprising:
   a substrate;
   a recording film provided on said substrate, said recording film being made of a magnetic metal thin film comprising crystalline particles and impregnated with lubricant, the density, or amount per second per unit area, of particles in said recording film being in a range of 10 to 100 cps/nm (count-/sec/nm) in terms of its fluorescent X-ray relative density where the fluorescent X-ray relative density represents the average number of counts per 1 (one) second for the film thickness of 1 nm of an object to be measured in the case where the fluorescent X-rays, which are emitted from the object when the object is irradiated with X-rays having a spot diameter of 15 mm, are measured for 10 (ten) seconds in a fluorescent X-ray analysis device under the measurement condition of a turn-on voltage of 50 KV and a turn-on current of 60 mA in an X-ray tube; and
   an underlying nonmagnetic metal layer provided between said substrate and said recording film, said underlying layer being made of crystalline particles of non-magnetic material and impregnated with lubricant among the crystalline particles, and having the crystalline particle density of less than 100 cps/nm in terms of its fluorescent X-ray relative density.

2. A magnetic recording medium according to claim 1, further comprising
   a protection film formed on said recording film, said protection film being made of low density crystalline particles of non-magnetic material and impregnated with lubricant, and having a crystalline particle density of 140 cps/nm or less in terms of its fluorescent X-ray relative density.

* * * * *

UNITED STATES PATENT AND TRADEMARK OFFICE
CERTIFICATE OF CORRECTION

PATENT NO. : 5,162,161  
DATED : 10 November 1992  
INVENTOR(S) : Susumu FUNAMOTO et al.

Page 1 of 2

It is certified that error appears in the above-indentified patent and that said Letters Patent is hereby corrected as shown below:

| Column | Line | |
|---|---|---|
| 2 | 2 | Change "complicate" to --complicated--. |
| 2 | 6 | Change "provided by " to --by providing--. |
| 2 | 28 | Change "100" to --100--. |
| 2 | 35 | After "irradiated" do not start new paragraph. |
| 3 | 14 | Change "DESCRIPTION OF THE PREFERRED EMBODIMENTS" to --DETAILED DESCRIPTION--. |
| 3 | 40 | After "in a" insert --direction--. |
| 3 | 41 | After "arrow" delete "direction". |
| 4 | 10 | Change "28" to --20--. |
| 4 | 11 | After "respective" delete "axis"; after "and" insert --the--; after "ordinate" insert --axis--. |
| 4 | 16 | Change "CK" to --$CK_a$--. |
| 4 | 41 | Change "pertluoropoly" to --perfluoropoly--. |
| 4 | 49 | Delete "to". |
| 4 | 63 | After "formed" insert --by--. |
| 5 | 16 | After "formed" insert --by--. |
| 5 | 17 | Change "an other" to --Another--. |
| 5 | 25 | Change "1000 A" to --1000 Å--. |
| 5 | 26 | Change "800 A" to --800 Å--. |
| 5 | 28 | Change "A" (first occurence) to --Å--; change "4000 A" to --4000 Å--. |

UNITED STATES PATENT AND TRADEMARK OFFICE
CERTIFICATE OF CORRECTION

PATENT NO. : 5,162,161

DATED : 10 November 1992

INVENTOR(S) : Susumu FUNAMOTO et al.

It is certified that error appears in the above-indentified patent and that said Letters Patent is hereby corrected as shown below:

| Column | Line | |
|---|---|---|
| 5 | 30 | Change "800 A" to --800 Å--. |

Signed and Sealed this

Second Day of November, 1993

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,162,161                            Page 1 of 2

DATED : November 10, 1992

INVENTOR(S) : Susumu FUNAMOTO et al.

It is certified that error appears in the above-indentified patent and that said Letters Patent is hereby corrected as shown below:

| Column | Line | |
|---|---|---|
| 2 | 2 | Change "complicate" to --complicated--. |
| 2 | 6 | Change "provided by " to --by providing--. |
| 2 | 28 | Change "100" to --100--. |
| 2 | 35 | After "irradiated" do not start new paragraph. |
| 3 | 14 | Change "DESCRIPTION OF THE PREFERRED EMBODIMENTS" to --DETAILED DESCRIPTION--. |
| 3 | 40 | After "in a" insert --direction--. |
| 3 | 41 | After "arrow" delete "direction". |
| 4 | 10 | Change "28" to --20--. |
| 4 | 11 | After "respective" delete "axis"; after "and" insert --the--; after "ordinate" insert --axis--. |
| 4 | 16 | Change "CK" to --CK$_x$--. |
| 4 | 41 | Change "pertluoropoly" to --perfluoropoly--. |
| 4 | 49 | Delete "to". |
| 4 | 63 | After "formed" insert --by--. |
| 5 | 16 | After "formed" insert --by--. |
| 5 | 17 | Change "an other" to --Another--. |
| 5 | 25 | Change "1000 A" to --1000 Å--. |
| 5 | 26 | Change "800 A" to --800 Å--. |
| 5 | 28 | Change "A" (first occurence) to --Å--; change "4000 A" to --4000 Å--. |

UNITED STATES PATENT AND TRADEMARK OFFICE
CERTIFICATE OF CORRECTION

PATENT NO. : 5,162,161
DATED : November 10, 1992
INVENTOR(S) : Susumu FUNAMOTO et al.

It is certified that error appears in the above-indentified patent and that said Letters Patent is hereby corrected as shown below:

<u>Column</u>  <u>Line</u>

5    30    Change "800 A" to --800 Å--.

This certificate supersedes Certificate of Correction issued October 02, 1993.

Signed and Sealed this

Ninth Day of May, 1995

Attest:

BRUCE LEHMAN

Attesting Officer    Commissioner of Patents and Trademarks